United States Patent
Uchiki et al.

(10) Patent No.: US 12,352,259 B2
(45) Date of Patent: Jul. 8, 2025

(54) PROGRAM UPDATE METHOD FOR THE GAS COMPRESSOR SYSTEM

(71) Applicant: Hitachi Industrial Equipment Systems Co., Ltd., Tokyo (JP)

(72) Inventors: Ryosuke Uchiki, Tokyo (JP); Yuuji Ikemura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 63 days.

(21) Appl. No.: 18/261,976

(22) PCT Filed: Dec. 21, 2021

(86) PCT No.: PCT/JP2021/047441
§ 371 (c)(1),
(2) Date: Jul. 18, 2023

(87) PCT Pub. No.: WO2022/158229
PCT Pub. Date: Jul. 28, 2022

(65) Prior Publication Data
US 2024/0068466 A1    Feb. 29, 2024

(30) Foreign Application Priority Data
Jan. 19, 2021  (JP) ................. 2021-006199

(51) Int. Cl.
*F04B 49/06* (2006.01)
*F04B 41/06* (2006.01)
(Continued)

(52) U.S. Cl.
CPC ............ *F04B 49/065* (2013.01); *F04B 41/06* (2013.01); *G06F 8/65* (2013.01); *F04C 28/00* (2013.01); *F04C 28/02* (2013.01); *F04D 25/16* (2013.01)

(58) Field of Classification Search
CPC .......... G06F 8/65; F04B 41/04; F04B 49/065; F04C 28/00; F04C 28/02; F04D 25/16
See application file for complete search history.

(56) References Cited

U.S. PATENT DOCUMENTS 11,976,788 B2 * 5/2024 Koizumi ................ F04B 41/06
2020/0201979 A1 * 6/2020 Sagawa ................ F04B 49/065
(Continued)

FOREIGN PATENT DOCUMENTS

| JP | 2010-277367 A | 12/2010 |
| JP | 2020-143858 A | 9/2020 |

(Continued)

OTHER PUBLICATIONS

International Search Report with English Translation and Written Opinion of International Patent Application No. PCT/JP2021/047441 dated Mar. 8, 2022 (9 pages).

*Primary Examiner* — Charles G Freay
(74) *Attorney, Agent, or Firm* — Foley & Lardner LLP

(57) ABSTRACT

A method of updating the program of a gas compressor system is provided. The system has gas compressors, a controller that controls the gas compressors by a program, a discharge piping system coupled with each of the gas compressors, and a control terminal that controls the controller of the gas compressors. Gas discharged from the discharge piping system is controlled by the controller by at least one of a predetermined pressure value and flow rate of the gas value, including obtaining a program update, updating the program for a first gas compressor in operation that is a target of the program update among the gas compressors, and operating at least one of a second or a third gas compressor of the gas compressors based on the predetermined pressure value and the predetermined flow rate of the gas value.

5 Claims, 4 Drawing Sheets

(51) Int. Cl.
  *G06F 8/65*      (2018.01)
  *F04C 28/00*     (2006.01)
  *F04C 28/02*     (2006.01)
  *F04D 25/16*     (2006.01)

(56) References Cited

U.S. PATENT DOCUMENTS

2021/0216306 A1* 7/2021 Moeller ................. G06F 8/656
2023/0367584 A1* 11/2023 Tai ......................... H04L 67/12

FOREIGN PATENT DOCUMENTS

WO   WO-2019/044553 A1   3/2019
WO   WO-2020/084939 A1   4/2020

* cited by examiner

PROGRAM UPDATE METHOD FOR THE GAS COMPRESSOR SYSTEM

TECHNICAL FIELD

This invention relates to a method of updating the program of a gas compressor system that updates the program of the compressor while maintaining the supply of compressed gas at a predetermined pressure and flow rate.

BACKGROUND ART

The 1st compressor 5, 2nd compressor 6, and 3rd compressor 7 are equipped with compressor bodies of various applicable types, such as positive displacement type and centrifugal type. The 1st compressor 5, 2nd compressor 6, and 3rd compressor 7 are coupled with the discharge piping system. In the discharge piping system, the compressed air from each air compressor is merged to provide the user with compressed air of a predetermined pressure and air volume. This example can be applied to any configuration of each gas compressor, whether constant speed, variable speed, or a mixture of both.

Such monitoring functions include the process of updating the control program of a gas compressor. For example, Patent Document 1 discloses a method for updating the program of a cooling system with a compressor that compresses a cooling medium, in which one of the multiple equipment controllers follows the instructions of the integrated controller to update the control program from one control program to another control program ("control program for UD"). Disclose that the update is performed.

CITATION LIST

Patent Document

Patent Documents 1 Patent Publication No. 2010-277367

SUMMARY OF THE INVENTION

Problems to be Solved by the Invention

The updating of programs used to operate the gas compressor and to monitor the above-mentioned operation status, for example, is carried out by having service workers load the updated programs directly into the fluid machinery at the site in accordance with the timing of the shutdown of the user's factory or the shutdown of the fluid machinery, which is time-consuming and costly. This is time-consuming and costly. In this respect, the program for updating can be automatically updated by sending the updating program from a remote server to the fluid machine using the monitoring function described above, but the program updating process requires the fluid machine to be stopped and restarted, during which time the supply of compressed gas is stopped.

Solutions to Problems

To solve the above problem, for example, the following configuration is applied. A method of updating a program of a gas compressor system, which is provided with a plurality of gas compressors having a gas compressor body and a controller that controls the gas compressor body by cooperation of a program and an arithmetic unit, a discharge piping system connected to each of said plurality of compressed gases, and a management device controlling a controller of said plurality of gas compressors, wherein said management device controls a control device of said plurality of gas compressors, and wherein said management device is used to update a program of a gas compressor system that supplies at least one of a pressure and a flow rate of gas discharged from said discharge piping system based on predetermined values. A method of updating the program of a gas compressor system that supplies at least one of the pressure and flow rate of the gas based on predetermined values, wherein the management device obtains the updating program, updates the program for the compressor in operation that is the target of the program update among the plurality of gas compressors The method of updating the program of a gas compressor system, which includes the steps of: obtaining the program for updating the program; and driving other gas compressors of the plurality of gas compressors, which are different from the running compressor whose program is to be updated, in accordance with the predetermined value.

Effects of the Invention

According to the invention, the software updates automatically while maintaining the supply of compressed gas according to predetermined values (set pressure and flow rate) during the program update process. Other issues, configurations, and effects of the invention are shown in the following description.

MODE FOR CARRYING OUT THE INVENTION

The following is a description of the form in which the invention is to be implemented, using the drawings.

Example 1

Example 1 will be explained in detail with reference to FIGS. 1 and 2. In each of the figures shown below, the same reference code is applied to common parts, and duplicated explanations may be omitted as appropriate.

Figure 1:
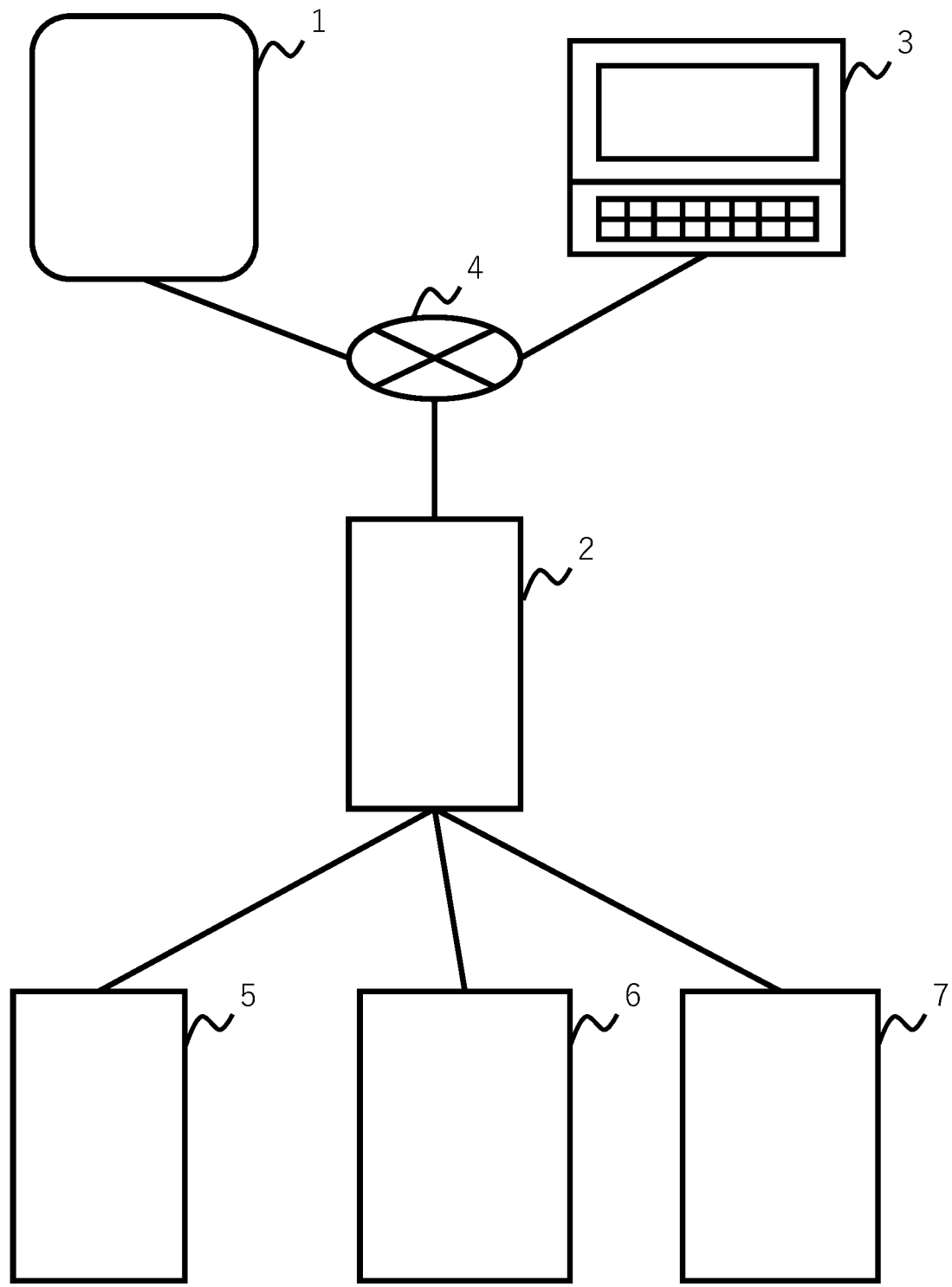
FIG. 1 is a schematic diagram showing the schematic structure of the embodiment to which the invention is applied.

FIG. 1 shows the configuration of a gas compressor system 50. The gas compressor system 50 is comprising a number of gas compressors (1st compressor 5, 2nd compressor 6, and 3rd compressor 7), a number of compressor control apparatus 2 that controls these compressors, a control saver 1, and a control terminal 3. The control saver 1, number of compressor control apparatus 2, and control terminal 3 are coupled with via a wired or wireless network 4 to enable communication of various control commands and feedback of control results. The control saver 1, number of compressor control apparatus 2, and control terminal 3 are connected via a wired or wireless network 4 to communicate various control commands and feedback of control results.

The 1st compressor5, 2nd compressor6, and 3rd compressor7 are equipped with compressor bodies of various applicable types, such as positive displacement type and centrifugal type. The 1st compressor5, 2nd compressor6, and 3rd compressor7 are coupled with the discharge piping system. In the discharge piping system, the compressed air from each air compressor is merged to provide the user with compressed air of a predetermined pressure and air volume.

This example can be applied to any configuration of each gas compressor, whether constant speed, variable speed, or a mixture of both.

The 1st compressor 5, 2nd compressor 6, and 3rd compressor 7 have a control function part by means of an arithmetic unit and a program that cooperates with it, and can start, stop, and perform various operational control of each gas compressor. The control function part also has a re-writable volatile and/or non-volatile memory to store the updated program in the program update process described below.

The number of compressor control apparatus 2 has an arithmetic unit and a control function unit that works with it to manage the operating schedules of the 1st compressor 5, 2nd compressor 6, and 3rd compressor 7 via wired or wireless communication lines. The operation schedule includes the number of gas compressors in operation and the order of operation. For example, depending on the pressure and volume of compressed air discharged from the discharge piping system, the system sends commands to each gas compressor to start up and operate one or three compressors, or to stop or operate a predetermined number of compressors without load. The number of compressor control apparatus 2 also has a processing function to update the control programs of each gas compressor in response to program update processing commands from control saver 1 described below.

Control saver 1 is a server device that has an arithmetic unit and a control function unit that works with it. Control terminal 3 is a terminal device that has an arithmetic unit and a control function unit that works with the arithmetic unit, and also provides an input device and an output device for various information to the manager of the gas compressor system, control saver 1 and control terminal 3 have a processing function for updating the control program of each gas compressor as described below. The control saver 1 and control terminal 3 have a processing function to update the control program of each gas compressor as described below.

In this example, control saver 1 and control terminal 3 are described as separate components, but the functions of both may be integrated into a single structure.

Network4 is a network consisting of various wired/wireless communication types, such as LAN, BAN, Internet, etc.

Figure 2:
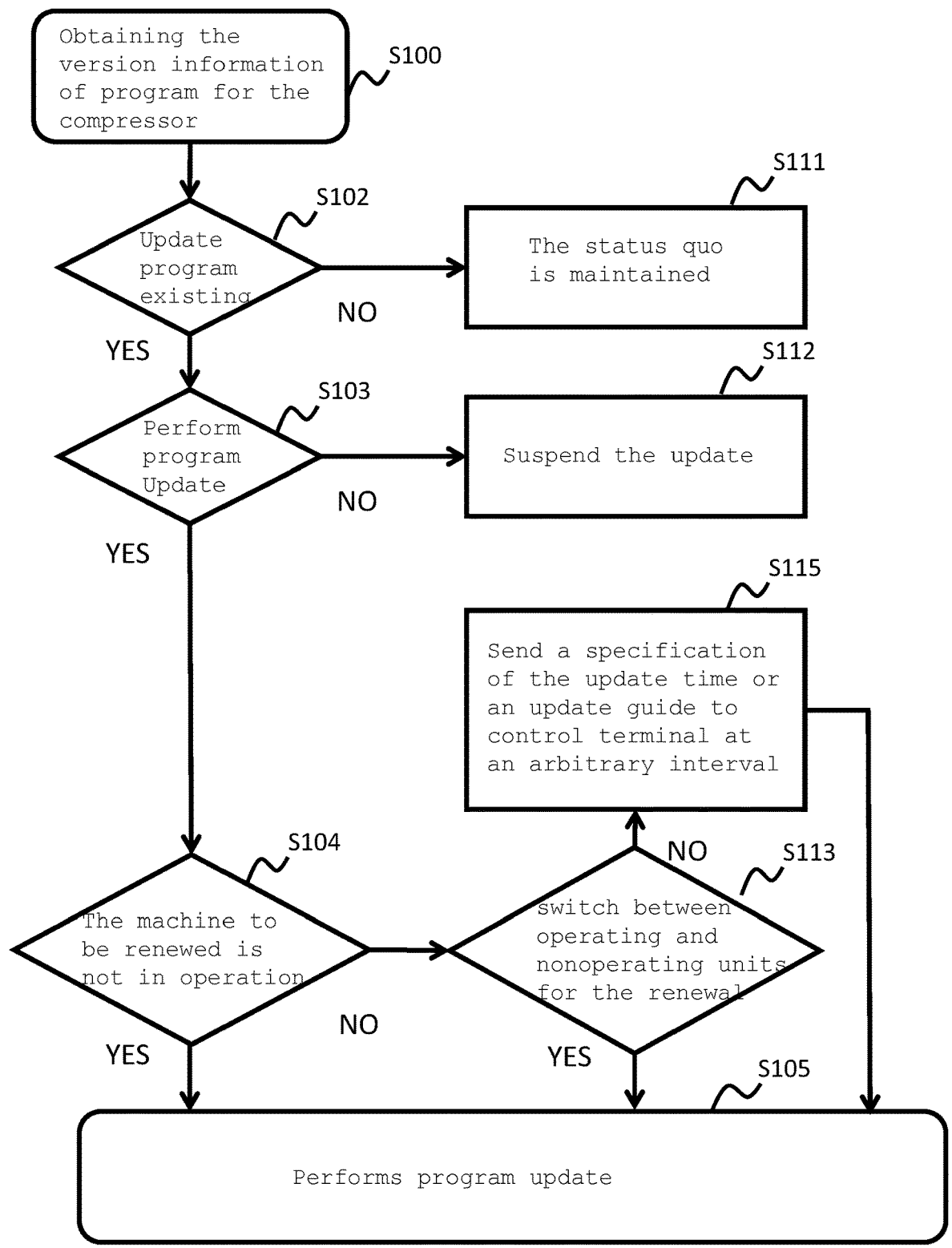
FIG. 2 shows a flow diagram of a control example based on Example 1.

Next, FIG. 2 is used to explain the program update process in this example.

At S100, control saver 1 sends a request to number of compressor control apparatus 2 to obtain the current version information of the program stored in each gas compressor, and obtains the current version information of the program. The version information of the program of each gas compressor can be stored in the number of compressor control apparatus 2, or the current version information stored in the memory of each gas compressor can be obtained by the number of compressor control apparatus 2. The program version information for each compressor may be stored in the number of compressor control apparatus 2 or the current version information stored in the memory of each compressor may be obtained by the number of compressor control apparatus 2.

At S102, control saver 1 compares the version of the current compressor program it has obtained and determines whether or not there are any updates. Control saver 1 outputs the update guide and execution availability information to control terminal 3 if there are updates, and moves to S103. If there are no updates, the status quo is maintained (S111).

At S103, control saver 1 proceeds to S104 if the response from control terminal 3 is "YES (perform update)". If the response from control terminal 3 is "NO (update not possible)," control saver1 goes to S112, and again outputs the update guide and the information on whether the update is possible or not to control terminal 3 at an arbitrary time (at a fixed time interval or at a random time interval) as a standby for update, and waits for a response.

At S104, control saver 1 checks the operating status of each gas compressor, and if the machine to be updated is ready for updating (stopped=ready for updating) (S104: YES), then go to S105. Control saver 1 checks if the machine is not ready for updating (running=not ready for updating) (S104 NO), it proceeds to S113. In this example, "in operation" of the gas compressor shall include stop and no-load operation.

In S113, control saver 1 displays the following A or B guide on control terminal3 and waits for a response.
  A: "The machine to be renewed is currently in operation. May I switch operation with the gas compressor that is stopped for renewal?"
  B: "May I ask that you automatically switch between operating and nonoperating units for the renewal?"

In other words, control saver 1 displays guide A on control terminal 3 when other gas compressors different from the one to be updated, among 1st compressor 5, 2nd compressor 6, and 3rd compressor 7, are stopped, and If all gas compressors are in operation, the guide B is displayed. In other words, while the gas compressor system is in operation, the compressed air supply is not stopped due to program updates.

If the answer to A or B above is "YES" (S113: YES), control saver 1 proceeds to S105 (If all gas compressors are in operation, it proceeds to S105 after the gas compressors to be updated can be stopped.). If the answer to A or B above is "NO" (S113: NO), control saver 1 proceeds to S115, sends a specification of the update time or an update guide to control terminal 3 at an arbitrary interval, and proceeds to S105 at the specified time or at the update instruction response.

In S105, control saver 1 performs program update processing for the compressor to be updated; if an update time is specified in S113, the update processing is performed at that time, or if an update implementation command is received from control terminal 3.

Thus, according to this example, the program update process can be performed efficiently without stopping the compressed air supply from the gas compressor system. Furthermore, the program update process can be prevented from being performed against the will of the gas compressor air system administrator.

Example 2

Example 2 is described next. In Example 1, when the gas compressor to be updated is "running," that is, operating at full speed or no load, one of the features is that the program is updated at the timing when it can be switched to another gas compressor that is stopped or switched to another gas compressor. Example 2 is characterized in that when the gas compressor to be updated is in full-speed operation, the program update of the compressor to be updated that is also stopped or in no-load operation is executed first.

Figure 3:
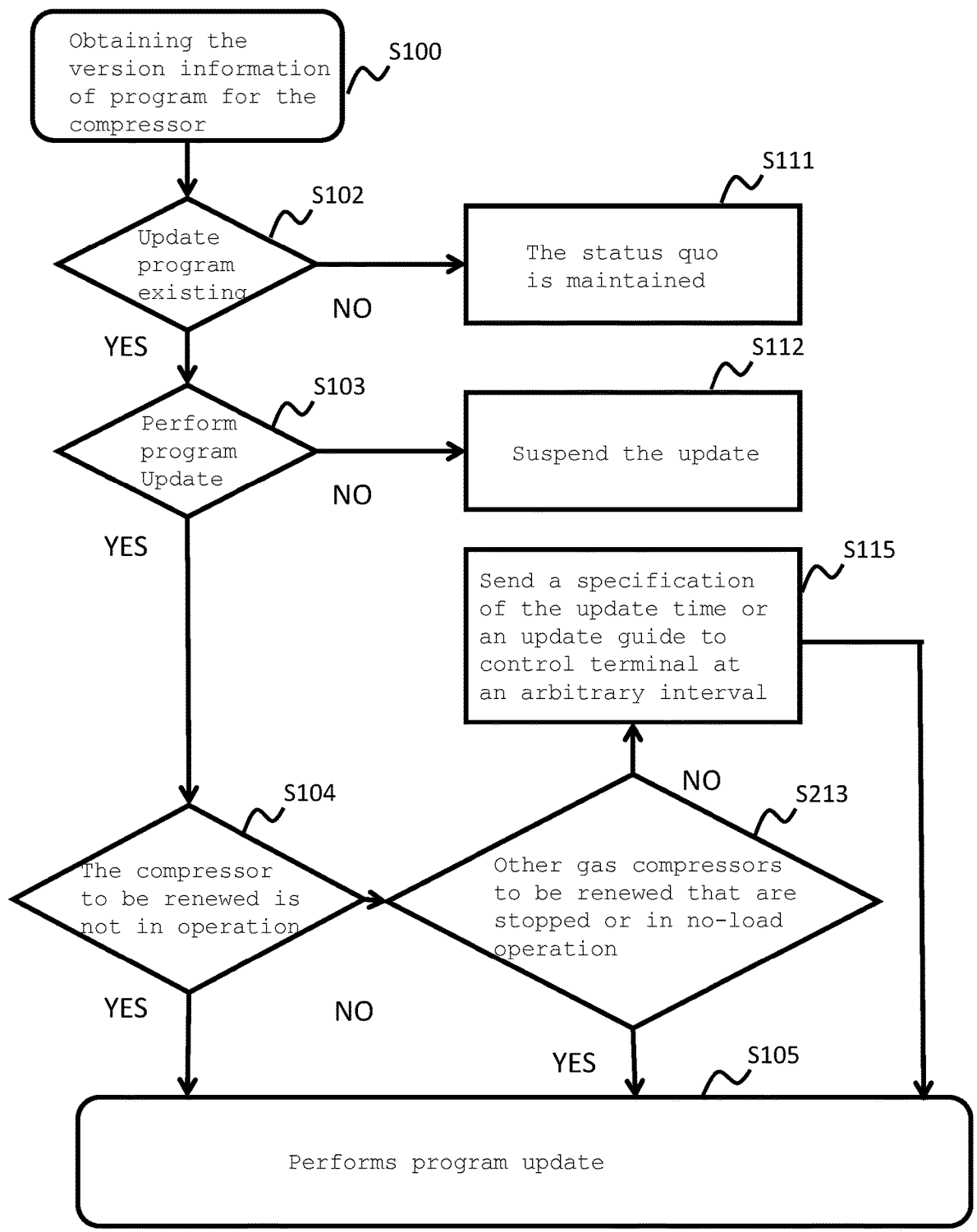
FIG. 3 shows a flow diagram of a control example based on Example 2.

FIG. 3 shows the process flow of Example 2. In the following explanation, since S213 in Example 2 differs from S113 in Example 1, this step is explained in particular, and the same reference code may be attached to common parts and the explanation may be omitted as appropriate.

In S213, control saver 1, which determined that the gas compressor to be updated in S104 is not currently stopped (S104: NO), displays the following C or D guide in control terminal3 and waits for a response.

C: "The machine to be renewed is currently in operation. May I start updating from other gas compressors that are stopped or in no-load operation?"
D: "May I switch the renewal order of the operating and stopping machines for the renewal?"

If the answer to C or D above is "YES" (S213: YES), control saver 1 proceeds to S105 (If other gas compressors are in no-load operation, it proceeds to S105 after the gas compressors in question can be stopped.) S105. In addition, Control saver 1, if the answer to C or D above is. NO" (S213: NO), it proceeds to process S115, transmits to control terminal 3 the update time specification or update guidance at an arbitrary interval, and proceeds to S105 at the specified time or at the time of the update instruction response.

If the update time is specified in S113, the update process is executed at that time. Or, if there is an update execution command from control terminal 3, the update processing is executed.

No-load operation is generally performed when the required pressure and air volume of compressed air at the demand destination via the discharge piping system is met. Therefore, it can be said to be a state in which the supply of compressed air to the demand destination can be continued even if the gas compressor is stopped during no-load operation. Thus, this example allows the program update process to be carried out efficiently without stopping the compressed air supply.

Example 3

Example 3 is described next. In Example 1, when the gas compressor to be updated is "running," i.e., operating at full speed or no load, one of the features of this example is that the program is updated at the timing when the operation can be switched to another gas compressor that is stopped or switched to another gas compressor. In Example 2, when the gas compressor to be updated is in full-speed operation, one of the features is that the program update of the gas compressor to be updated and that is stopped or in no-load operation is executed first.

Example 3 is characterized by the fact that when the gas compressor to be updated is in full-load operation and all compressors to be updated are in full-load operation, the program is updated starting with the compressor to be updated that is stopped or in no-load operation first.

Figure 4:
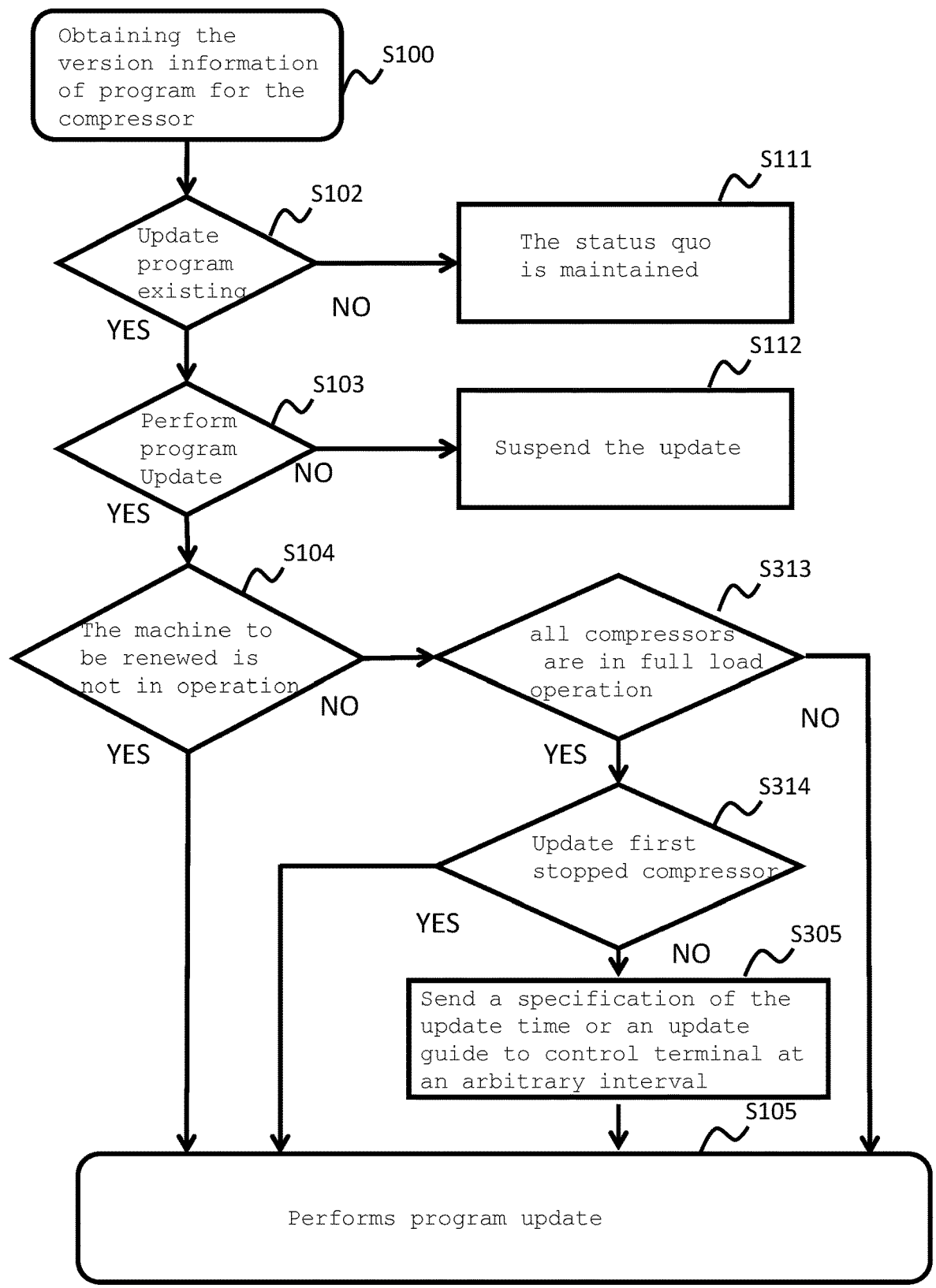
FIG. 4 shows a flow diagram of a control example based on Example 3.

FIG. 4 shows the process flow of Example 3. In the following explanation, since S313, S314, and S315 are mainly different in Example 3 compared to Example 1 or 2, these steps are explained in particular, and common parts are marked with the same reference codes and explanations may be omitted as appropriate.

In S313, control saver 1 determines that the gas compressor to be updated is not stopped (S104: NO) in S104, and then determines whether all gas compressors are in full load operation. If all compressors are in full load operation (S313: YES), control saver 1 proceeds to S314, if any compressor is stopped or in no-load operation (S313: NO), control saver 1 proceeds to S105 to execute the program update process for the stopped or in no-load operation gas compressor.

At S314, control saver 1 displays the following E or F guide on control terminal 3 and waits for a response.
E: "All machines to be renewed are currently in full load operation. May I start with the gas compressor that has stopped or is in no-load operation first?"
F: "May I start with a gas compressor that has been stopped or is in no-load operation for renewal?"

If the answer to E or F is "YES" (S314: YES) in S314, control saver 1 goes to S105 to update the program of the gas compressor that is the target of the update and that was stopped earlier. If the answer to E or F is "NO" (S314: NO), control saver 1 goes to S315 and displays a request to specify a time to update the program or a guide to update at arbitrary time intervals on control terminal 3. If there is a response for a specified time, the program update is performed at that specified time, and if there is a request to perform a program update, the update is performed immediately.

Thus, according to this example, if there are no other gas compressors stopped or in no-load operation, the program update process can be performed starting with the gas compressor that stopped or went into no-load operation first, and the program update of the gas compressor can be performed efficiently while maintaining the air supply from the gas compressor.

The invention is not limited to the various examples described above, but can be modified in various ways without departing from the intent of the invention. For example, it is possible to replace some of the contents of other examples with parts of other examples.

In particular, in this actual example, the gas compressor system is described as a configuration in which control saver 1, number of compressor control apparatus 2, and control terminal 3 communicate and control each other via network 4, but they may be functionally integrated. The configuration of the gas compressor system can also be functionally integrated.

In this example, an air compressor is illustrated as a gas compressor, but the invention can also be applied to compressor systems that compress other media.

REFERENCE SIGNS LIST

1 Control saver management server
2 Number of compressor control apparatus
3 Control terminal Control terminal
4 Network Communication network
5 $1^{st}$ compressor first gas compressor
6 $2^{nd}$ compressor second gas compressor
7 $3^{rd}$ compressor third gas compressor

The invention claimed is:
1. A method of updating the program of a gas compressor system
which has a plurality of gas compressors,
a controller that controls the plurality of gas compressors, wherein each of the plurality of gas compressors store a program and the plurality of gas compressors comprises a first gas compressor, a second gas compressor, and a third gas compressor,
and
a control terminal that controls the controller of the plurality of gas compressors, wherein gas is controlled by the controller by at least one of a predetermined pressure value and a predetermined flow rate of the gas value, the method comprising:

obtaining a program update, updating a first program of the first gas compressor that is a target of the program update among the plurality of gas compressors, and operating at least one of the second or the third gas compressor based on the predetermined pressure value and the predetermined flow rate of the gas value.

2. The method of updating the program of a gas compressor system of claim 1 wherein at least one of the second or third gas compressors is a stopped compressor.

3. The method of updating the program of a gas compressor system of claim 1 wherein at least one of the second or third gas compressors is a compressor in no-load operation.

4. The method for updating the program of a gas compressor system of claim 1, further comprising updating the first program of the first gas compressor in response to determining that the first gas compressor has been stopped or is in no-load operation, when at least one of the second or the third gas compressors are in full load operation.

5. The method for updating the program of a gas compressor system of claim 1, further comprising determining whether or not to drive at least one of the second or third gas compressors according to the predetermined pressure value and the predetermined gas flow rate value, before updating the first program of the first gas compressor that is the target of the program update.

\* \* \* \* \*